(12) United States Patent
Goin

(10) Patent No.: US 7,486,069 B2
(45) Date of Patent: Feb. 3, 2009

(54) INDICATOR ROD

(76) Inventor: James Goin, 2421 Adair Ave. NE., Knoxville, TN (US) 37917

( * ) Notice: Subject to any disclaimer, the term of this patent is extended or adjusted under 35 U.S.C. 154(b) by 0 days.

(21) Appl. No.: 11/765,147

(22) Filed: Jun. 19, 2007

(65) Prior Publication Data

US 2008/0315910 A1    Dec. 25, 2008

(51) Int. Cl.
*G01R 33/00* (2006.01)
*G09F 9/00* (2006.01)
*G01D 13/22* (2006.01)

(52) U.S. Cl. .................. 324/261; 324/800; 116/309

(58) Field of Classification Search ............ 324/244, 324/260–261, 800; 116/200, 204, 223, 309
See application file for complete search history.

(56) References Cited

U.S. PATENT DOCUMENTS

| D245,233 S | * | 8/1977 | Wolfe | D10/46 |
| D248,377 S | * | 7/1978 | Wolfe | D10/46 |
| 2005/0146325 A1 | * | 7/2005 | Le Roux | 324/244 |

* cited by examiner

*Primary Examiner*—Bot LeDynh
(74) *Attorney, Agent, or Firm*—Pitta & Brittian, PC

(57) ABSTRACT

An indicator rod responsive to environmental variations is disclosed. A handle defines an elongated cavity having a linear axis. A pin is received within the cavity substantially along the linear axis, and is adapted to rotate about the linear axis. An indicator member is secured to the pin such that the pin extends in a substantially non-parallel orientation from the indicator member.

13 Claims, 3 Drawing Sheets

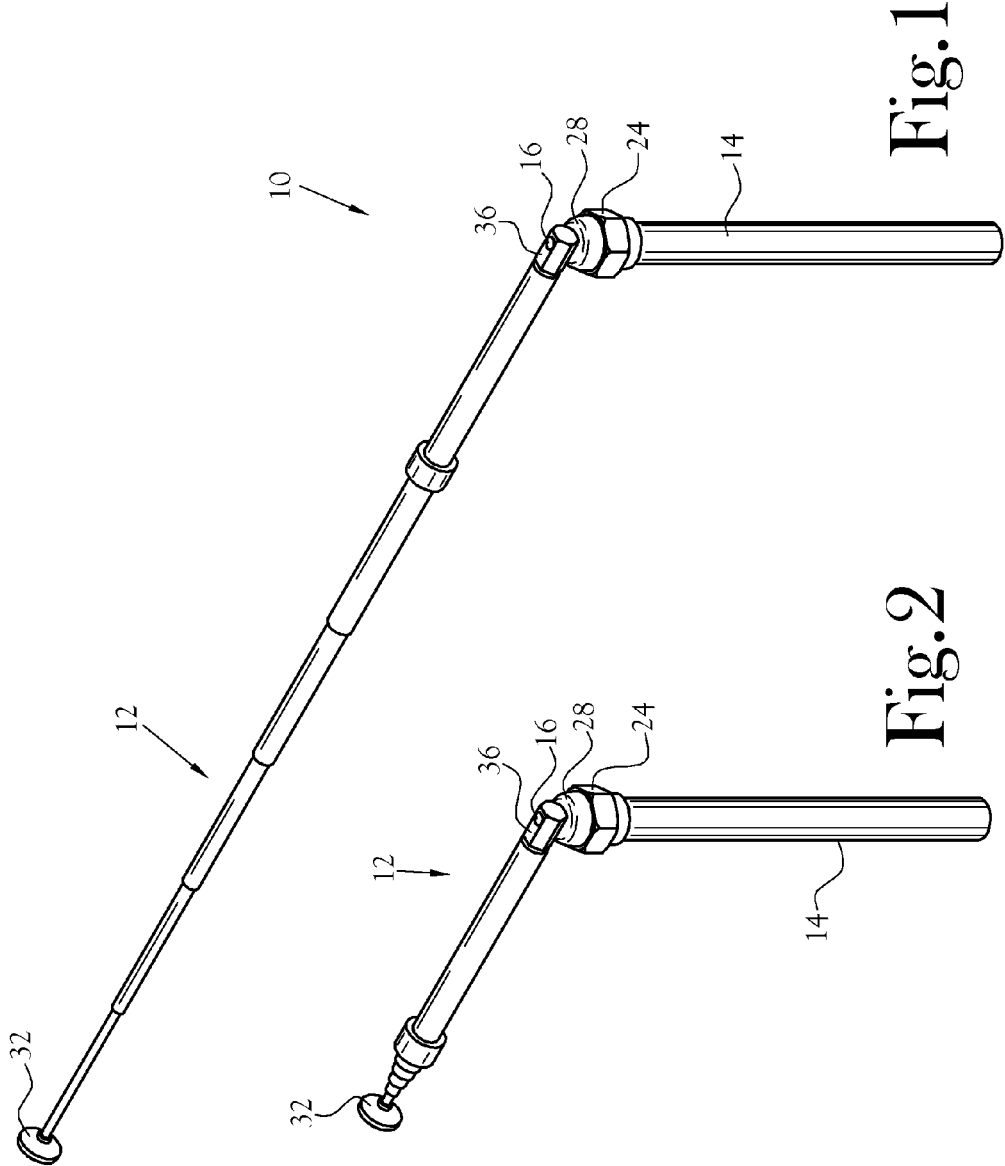

INDICATOR ROD

CROSS-REFERENCE TO RELATED APPLICATIONS

Not Applicable

STATEMENT REGARDING FEDERALLY-SPONSORED RESEARCH OR DEVELOPMENT

Not Applicable

BACKGROUND OF THE INVENTION

1. Field of Invention

This invention relates to responsive directional indicators. More specifically, this invention relates to a responsive directional indicator for amusement and study which produces a directional indication responsive to environmental variations.

2. Description of the Related Art

For many years, people have sought amusement or enlightenment from devices such as divining rods, dowsing rods, Ouija® Boards, or other such devices (hereinafter "divining tools"). These divining tools commonly consist of an indicator which is responsive to small variations in energy from sources such as wind, vibratory movement, frictional variations, electromagnetic fields, and other such variations (hereinafter "environmental variations"). In use, the indicator is typically held and observed by the user, whereupon directional changes in the indicator responsive to environmental variations are interpreted by the user for amusement or study. In the case of the Ouija® Board, the indicator is used to indicate numbers, letters and symbols on a board, whereupon the user then interprets the indicated numbers, letters and symbols for a meaning. In the case of divining rods, the indicator is allowed to move through an environment, whereupon the user is able to interpret responsive changes in the indicator for any of numerous conditions or criteria.

Historically, spiritual or mystical significance has been placed upon the responsive changes in the indicator of a divining tool. Various users of divining tools have interpreted responsive directional changes of the indicators as indicative of the presence of underground water, electromagnetic fields, telluric phenomenon, human illness, and other conditions. Today, although some still believe in the spiritual and mystical significance of divining tools, such divining tools are commonly utilized for recreation, exhibition, and entertainment.

Regardless of the user's belief in the mystical aspect of divining tools, such divining tools are dependent upon the ability of the indicator to translate relatively small and otherwise unobservable environmental variations into at least one observable indication. For example, in one traditional form of divining tool known as the virgula divina, a forked branch of a hazel tree responds to environmental variations, thereby causing a portion of the branch to bend or flex. However, the responsive nature of the particular virgula divina is limited by the stiffness of the wood with which it is fabricated, resulting in the need for larger and more observable environmental variations in order to produce an indication. Ultimately, if the environmental variations necessary to produce an indication in the divining tool are observable by the user absent the divining tool, the illusion that the indicator is being acted upon by a mystical force is destroyed. As such, conventional divining tools utilizing an indicator are limited by an inability to allow a more free directional change of the indicator, such that the indicator is more responsive to smaller and less observable environmental variations.

BRIEF SUMMARY OF THE INVENTION

In accordance with one aspect of the present invention, there is provided an indicator rod responsive to environmental variations. In one embodiment of the indicator rod, a handle is provided which defines an elongated cavity having a linear axis. A pin is received within the cavity substantially along the linear axis. The pin is adapted to rotate about the linear axis within the cavity. An indicator member is secured to the pin such that the pin extends in a substantially non-parallel orientation from the indicator member. In this configuration, the indicator member and the pin are capable of rotating proximate the handle in response to environmental variations acting upon the indicator rod.

BRIEF DESCRIPTION OF THE SEVERAL VIEWS OF THE DRAWINGS

The above-mentioned features of the invention will become more clearly understood from the following detailed description of the invention read together with the drawings in which:

FIG. 1 is a perspective view of one embodiment of an indicator rod constructed in accordance with several features of the present invention;

FIG. 2 is a perspective view of the embodiment of the indicator rod of FIG. 1, showing the indicator member in a collapsed position;

DETAILED DESCRIPTION OF THE INVENTION

Accordingly, an indicator rod responsive to environmental variations is illustrated generally at 10 in the Figures. Referring to FIG. 1, the indicator rod 10, or rod 10, includes an indicator member 12 pivotally secured to a handle 14. As will be further explained below, the indicator member 12 is adapted to extend from the handle 14 and freely rotate proximate the handle 14 such as to allow the indicator member 12 to be substantially rotationally responsive to environmental variations.

The indicator member 12 is a substantially rigid, elongated member. The indicator member 12 is adapted to be selectively configured between a collapsed position (see FIG. 2) and an extended position (see FIG. 1). In the illustrated embodiment, the indicator member 12 is defined by a telescopically extendable member. In another embodiment, the indicator member 12 is defined by a plurality of members which can be selectively joined in an end-to-end configuration. In still another embodiment, the indicator member 12 is defined by a plurality of members hinged together in an end-to-end configuration. Those skilled in the art will recognize other configurations suitable to accomplish selective collapsibility of the indicator member 12, and such configurations may be used without departing from the spirit and scope of the present invention.

Figure 3:
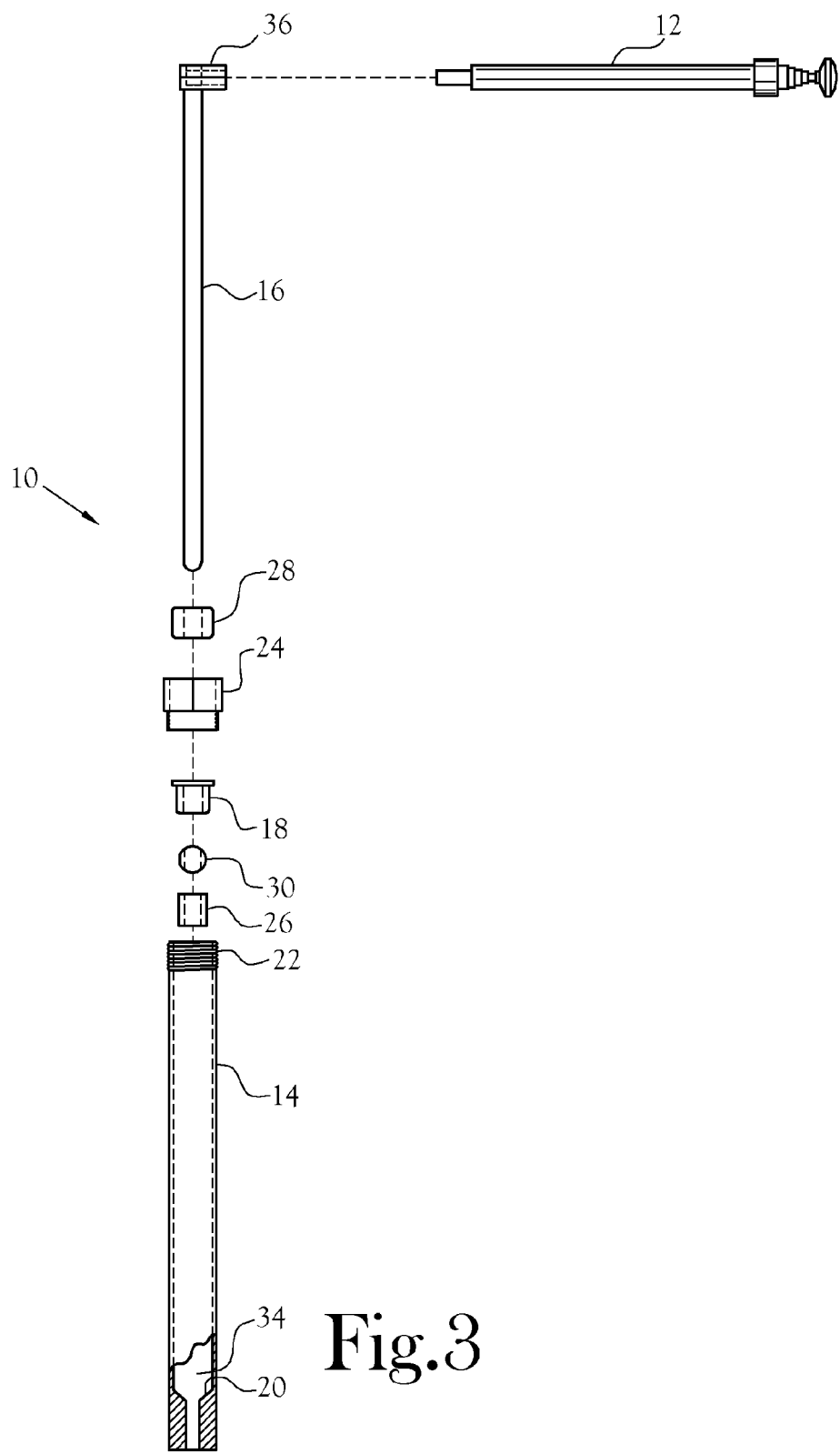
FIG. 3 is an exploded view of the indicator rod of FIG. 1.

FIG. 3 shows an exploded view of one embodiment of the rod 10. As shown in FIG. 3, an elongated, substantially cylindrical pin 16 is secured proximate one end of the indicator member 12 such that the pin 16 extends in a substantially non-parallel orientation from the indicator member 12. In a preferred embodiment, the pin 16 is fixed to the indicator member 12 such that the pin 16 extends substantially perpendicular to the indicator member 12. In the illustrated embodiment, a fastener 36 is provided to allow the indicator member 12 to be selectively detachable from the pin 16. In another embodiment, the indicator member 12 and the pin 16 are integrally formed. Those skilled in the art will recognize other configurations suitable for securing the indicator member 12 to the pin 16.

The handle 14 is a hollow member defining an elongated cavity 34. The handle 14 is adapted to receive the pin 16 within the cavity 34 such as to allow the pin 16 to rotate proximate the handle 14. In the present embodiment, a first bushing 18 and a second bushing 20 are each provided to cooperatively maintain the pin 16 along a linear axis of the cavity 34. The bushings 18, 20 each surround a portion of the pin 16 and are each sized to fit substantially within the handle 14. In the illustrated embodiment, the first bushing 18 is independently formed, while the second bushing 20 is integrally formed with the handle 14. In another embodiment, both the bushings 18, 20 are integrally formed with the handle 14. In another embodiment, the cavity 34 defines a substantially cylindrical shape which is sized to substantially conform to the pin 16. Those skilled in the art will recognize other suitable devices and configurations suitable for maintaining the pin 16 and along a linear axis of the cavity 34, and such devices and configurations may be used without departing from the spirit and scope of the present invention.

At least one fastener is provided to secure the pin 16 in place along the linear axis of the cavity 34. In the illustrated embodiment of FIG. 3, the handle 14 defines a threaded end 22. The pin 16 and bushings 18, 20 are each received within the handle 14 through the threaded end 22. A threaded cap 24 is provided to thread onto the threaded end 22, thereby substantially enclosing the bushings 18, 20 within the handle 14. The pin 16 is configured to protrude through the cap 24 and secure to the indicator member 12 disposed externally to the handle 14.

A grommet 26 is secured to the pin 16 opposite the first bushing 18 from the cap 24. In the illustrated embodiment, the grommet 26 is secured to the pin 16 by a frictional connection. Of course, it will be understood that other operative connections can be used to secure the grommet 26 to the pin 16 without departing from the spirit and scope of the present invention. The grommet 26 cooperates with the cap 24 to limit movement of the pin 16 along the linear axis of the cavity 34.

In the illustrated embodiment, the grommet 26 and the cap 24 cooperate to define the at least one fastener provided to restrain the pin 16 against movement coaxially along the handle 14. Those skilled in the art will recognize other devices and configurations suitable to restrain the pin 16 from movement along the coaxis of the pin 16 and the handle 14, and such other devices and configurations may be used without departing from the spirit and scope of the present invention.

A plurality of bearings 28, 30 are provided along the pin 16 to limit frictional resistance of the rotation of the pin 16 within the handle 14. In the illustrated embodiment, a first bearing 28 is provided between the cap 24 and the fastener 36 in order to reduce frictional resistance between the cap 24 and the indicator member 12. A second bearing 30 is provided between the first bushing 18 and the grommet 26 to reduce frictional resistance between the first bushing 18 and the grommet 26. In the illustrated embodiment, the first bearing 28 is fabricated from glass, and the second bearing 30 is fabricated from brass. Those skilled in the art will recognize other materials suitable for use in fabricating the bearings 28, 30.

Figure 4:
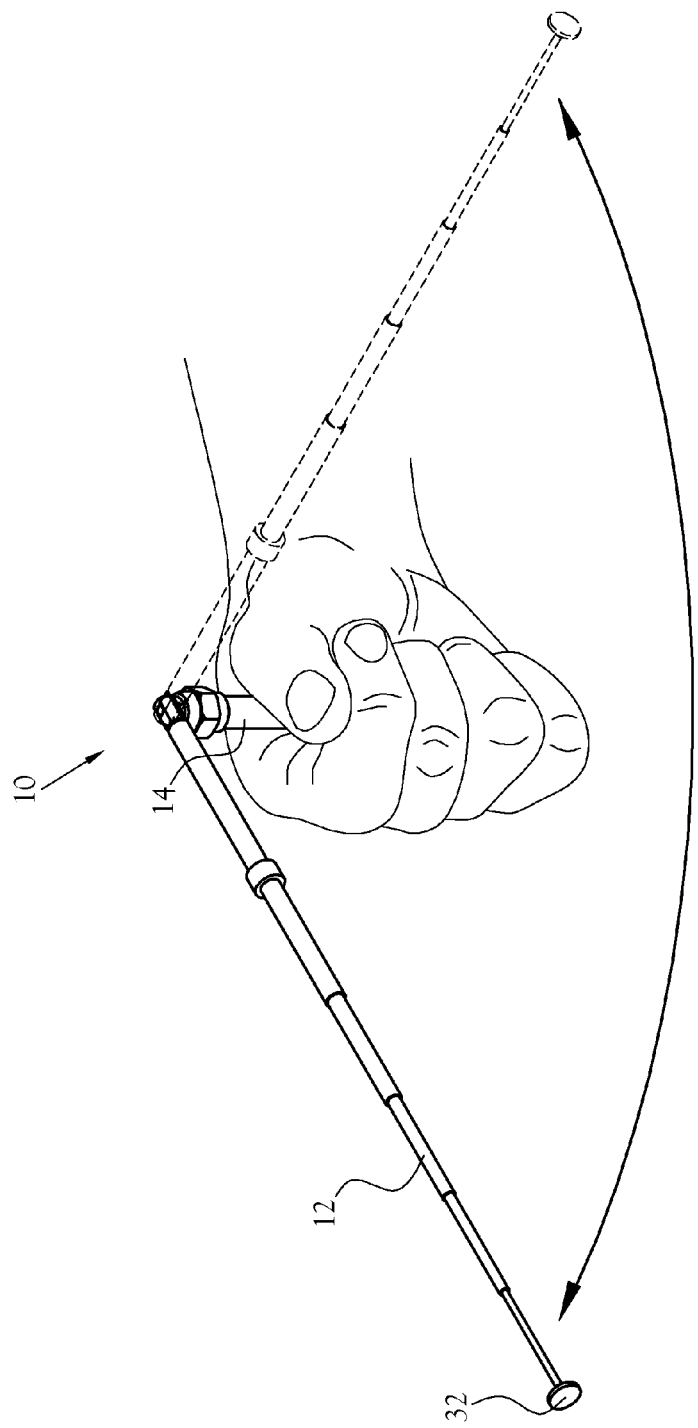
FIG. 4 is a perspective view showing one application of the indicator rod.

FIG. 4 illustrates one application of the indicator rod 10. In use, the handle 14 is held such that the linear axis of the cavity 34 is maintained in a substantially vertical configuration. As mentioned above, the indicator member 12 is adapted to extend from the handle 14 and freely rotate proximate the handle 14 in response to environmental variations. The user is then able to interpret the response of the indicator member 12 based upon the purpose of use of the indicator rod 10, i.e. for amusement, study, spiritual devotion, and the like. By lengthening the indicator member 12 to an extended position (see FIG. 1), the user is able to increase the reactivity of the indicator member 12 to environmental variations. Likewise, by shortening the indicator member 12 to a collapsed position (see FIG. 2), the user is able to decrease the reactivity of the indicator member 12 to environmental variations. Such collapsibility further allows for easy transportation and storage of the rod 10.

In several embodiments, a reactive material 32 is secured to the indicator member 12 opposite the handle 14. The reactive material 32 is a material adapted to be responsive to at least one environmental variation. In the illustrated embodiment, the reactive material 32 is a plug of solid metal material which is adapted to add to the overall mass of the end of the indicator member 12 opposite the handle 14. In this configuration, the reactive material 32 increases the downward gravitational forces acting upon the indicator member 12 as a result of gravity acting upon the combined indicator member 12 and the reactive material 32. Thus, environmental variations such as slight changes in pitch of the handle 14 result in gravitational forces causing rotation of the indicator member 12 proximate the handle 14. In instances in which such environmental variations are not otherwise readily observable by the user, the ultimate visual effect to the user is the illusion that the indicator member 12 is rotating absent external provocation. In another embodiment, the reactive material 32 is fabricated from material adapted to exhibit attraction/repulsion in response to electrostatic charge. In still another embodiment, the reactive material 32 is a magnetic material. Those skilled in the art will recognize other suitable materials for fabrication of the reactive material, and such materials may be used without departing from the spirit and scope of the present invention.

From the foregoing description, it will be apparent to one skilled in the art that an indicator rod 10 has been disclosed. The indicator rod 10 allows a user to interact with relatively small and otherwise unobservable environmental variations and translate those environmental variations into an observable directional indication. The various connections between the indicator member 12 and the handle 14 allow the indicator member 12 to freely rotate proximate the handle 14 and to respond to various environmental variations.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicants general inventive concept.

Having thus described the aforementioned invention, what is claimed is:

1. An indicator rod responsive to environmental variations, said indicator rod comprising:
   an indicator member having a first end and a second end;
   a pin secured proximate said indicator member first end such that said pin extends in a substantially non-parallel orientation from said indicator member; and
   a handle defining an elongated cavity having a linear axis, said handle being adapted to receive said pin within said cavity substantially along said linear axis such as to allow said pin to rotate about said linear axis within said cavity;
   whereby said indicator member and said pin are capable of rotating proximate said handle in response to environmental variations acting upon said indicator rod and wherein said indicator member is defined by a selectively collapsible member.

2. The indicator rod of claim 1, wherein said indicator member is defined by a telescoping member.

3. The indicator rod of claim 1, further comprising at least one bushing substantially surrounding at least a portion of said pin to support said pin in a configuration substantially along said linear axis.

4. An indicator rod responsive to environmental variations, said indicator rod comprising:
   an indicator member having a first end and a second end;
   a pin secured proximate said indicator member first end such that said pin extends in a substantially non-parallel orientation from said indicator member;
   a handle defining an elongated cavity having a linear axis, said handle being adapted to receive said pin within said cavity substantially along said linear axis such as to allow said pin to rotate about said linear axis within said cavity; and
   at least one fastener configured to secure said pin within said cavity;
   whereby said indicator member and said pin are capable of rotating proximate said handle in response to environmental variations acting upon said indicator rod.

5. The indicator rod of claim 4, said fastener further comprising:
   a cap secured to said handle such as to substantially enclose said a portion of said pin within said cavity, said cap defining an opening adapted to allow said pin to protrude partially through said cap; and
   a grommet secured to said pin;
   whereby said cap serves to restrain said grommet within said cavity.

6. The indicator rod of claim 5 further comprising at least one bushing substantially surrounding at least a portion of said pin to support said pin in a configuration substantially along said linear axis.

7. The indicator rod of claim 6, wherein said at least one bushing is disposed along said pin between said cap and said grommet.

8. The indicator rod of claim 6, said at least one bushing comprising
   a first bushing disposed along said pin proximate said cap; and
   a second bushing disposed along said pin opposite said cap.

9. The indicator rod of claim 8, wherein said first bushing is disposed along said pin between said cap and said grommet.

10. The indicator rod of claim 9 further comprising:
    a first bearing disposed along said pin between said cap and said indicator member; and
    a second bearing disposed along said pin between said bushing and said grommet.

11. The indicator rod of claim 10, wherein said first bearing is fabricated from glass.

12. The indicator rod of claim 10, wherein said second bearing is fabricated from brass.

13. An indicator rod responsive to environmental variations, said indicator rod comprising:
    an indicator member having a first end and a second end;
    a pin secured proximate said indicator member first end such that said pin extends in a substantially non-parallel orientation from said indicator member;
    a handle defining an elongated cavity having a linear axis, said handle being adapted to receive said pin within said cavity substantially along said linear axis such as to allow said pin to rotate about said linear axis within said cavity;
    a reactive material adapted to be responsive to at least one environmental variation, said reactive material being secured to said indicator member proximate said second end;
    whereby said indicator member and said pin are capable of rotating proximate said handle in response to environmental variations acting upon said indicator rod and wherein said reactive material is of sufficient mass to substantially increase downward gravitational forces acting upon said indicator member as a result of gravity acting upon said reactive material.

* * * * *